(12) United States Patent
Nakaya et al.

(10) Patent No.: US 11,701,964 B2
(45) Date of Patent: Jul. 18, 2023

(54) FUEL TANK

(71) Applicant: YACHIYO INDUSTRY CO., LTD., Saitama (JP)

(72) Inventors: Kazunari Nakaya, Tochigi (JP); Takuya Shiraishi, Tochigi (JP); Hiroya Mitsuhashi, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/773,982

(22) PCT Filed: Nov. 6, 2020

(86) PCT No.: PCT/JP2020/041608
§ 371 (c)(1),
(2) Date: May 3, 2022

(87) PCT Pub. No.: WO2021/090937
PCT Pub. Date: May 14, 2021

(65) Prior Publication Data
US 2023/0001784 A1   Jan. 5, 2023

(30) Foreign Application Priority Data
Nov. 8, 2019 (JP) .................... 2019-203076

(51) Int. Cl.
*B65D 6/34* (2006.01)
*B60K 15/03* (2006.01)
*B60K 15/035* (2006.01)

(52) U.S. Cl.
CPC ...... *B60K 15/03177* (2013.01); *B60K 15/035* (2013.01); *B60K 2015/03032* (2013.01)

(58) Field of Classification Search
CPC ........... B60K 2015/03032; B60K 2015/03453; B60K 2015/03493; B60K 15/03177; B60K 15/035; B29C 49/20
USPC ................................ 220/4.14, 653, 562, 651
See application file for complete search history.

(56) References Cited

U.S. PATENT DOCUMENTS

| 3,368,708 | A  | * | 2/1968 | Pflederer | F17C 1/16 |
| | | | | | 220/582 |
| 2015/0344183 | A1 | * | 12/2015 | Quant | B65D 25/20 |
| | | | | | 220/567.2 |
| 2018/0065475 | A1 | * | 3/2018 | Amano | B60K 15/03177 |

FOREIGN PATENT DOCUMENTS

| JP | 2003-025418 A | 1/2003 |
| JP | 2016-020061 A | 2/2016 |
| JP | 2018-039413 A | 3/2018 |
| WO | 2018/225413 A1 | 12/2018 |

(Continued)

OTHER PUBLICATIONS

International Search Report and Written Opinion of the International Search Report for PCT/JP2020/041608 dated Jan. 12, 2021.

(Continued)

*Primary Examiner* — King M Chu
(74) *Attorney, Agent, or Firm* — Kenealy Vaidya LLP

(57) ABSTRACT

A fuel tank includes a built-in component having a head portion, a neck portion, and a shoulder portion, the built-in component being anchored to a tank body by blowing air from outside a parison to cause the parison wrap around the neck portion during molding of the tank body. A slit extending in one direction only is formed on a surface of the shoulder portion as an air vent path.

2 Claims, 11 Drawing Sheets

(56) References Cited

FOREIGN PATENT DOCUMENTS

| WO | WO-2018225413 A1 | * | 12/2018 | ............ | B29C 49/18 |
|----|------------------|---|---------|--------------|------------|
| WO | 2021/090937 A1   |   | 5/2021  |              |            |

OTHER PUBLICATIONS

International Preliminary Report on Patentability for PCT/JP2020/041608 dated Sep. 7, 2021 and partial English translation of relevant portions showing indication of patentability for PPH Request.

* cited by examiner

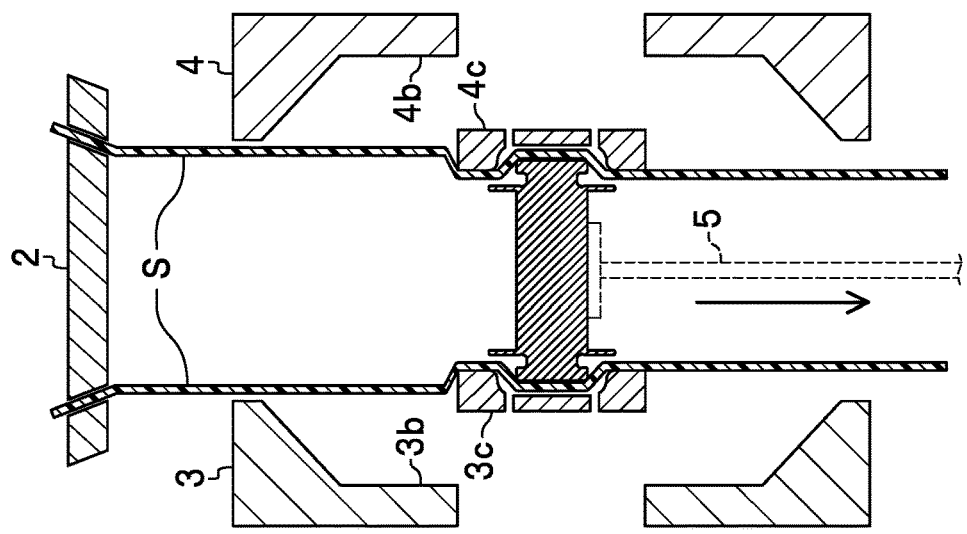
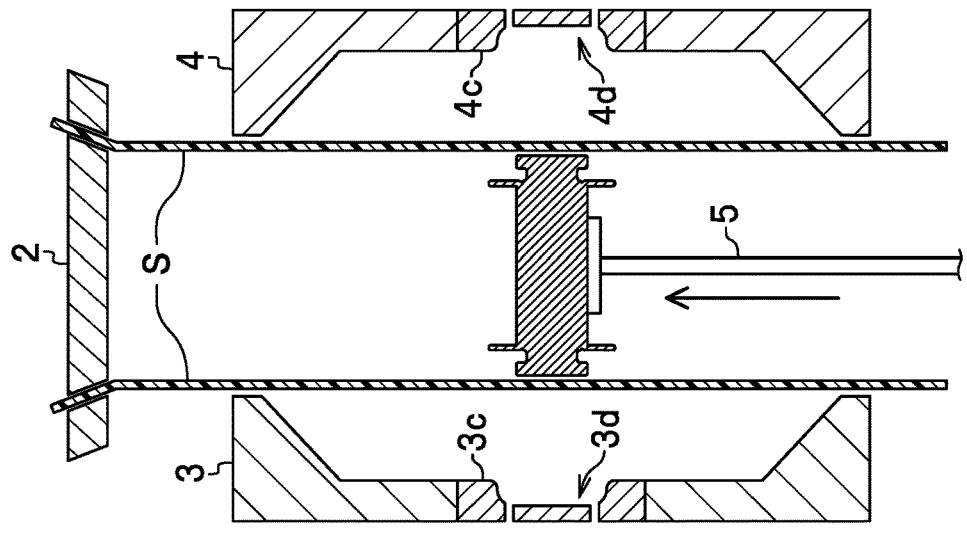
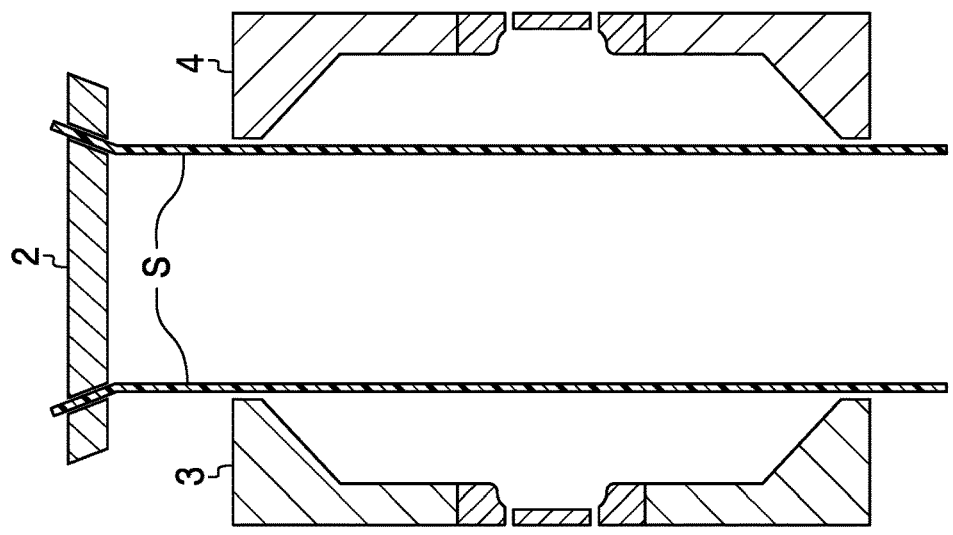

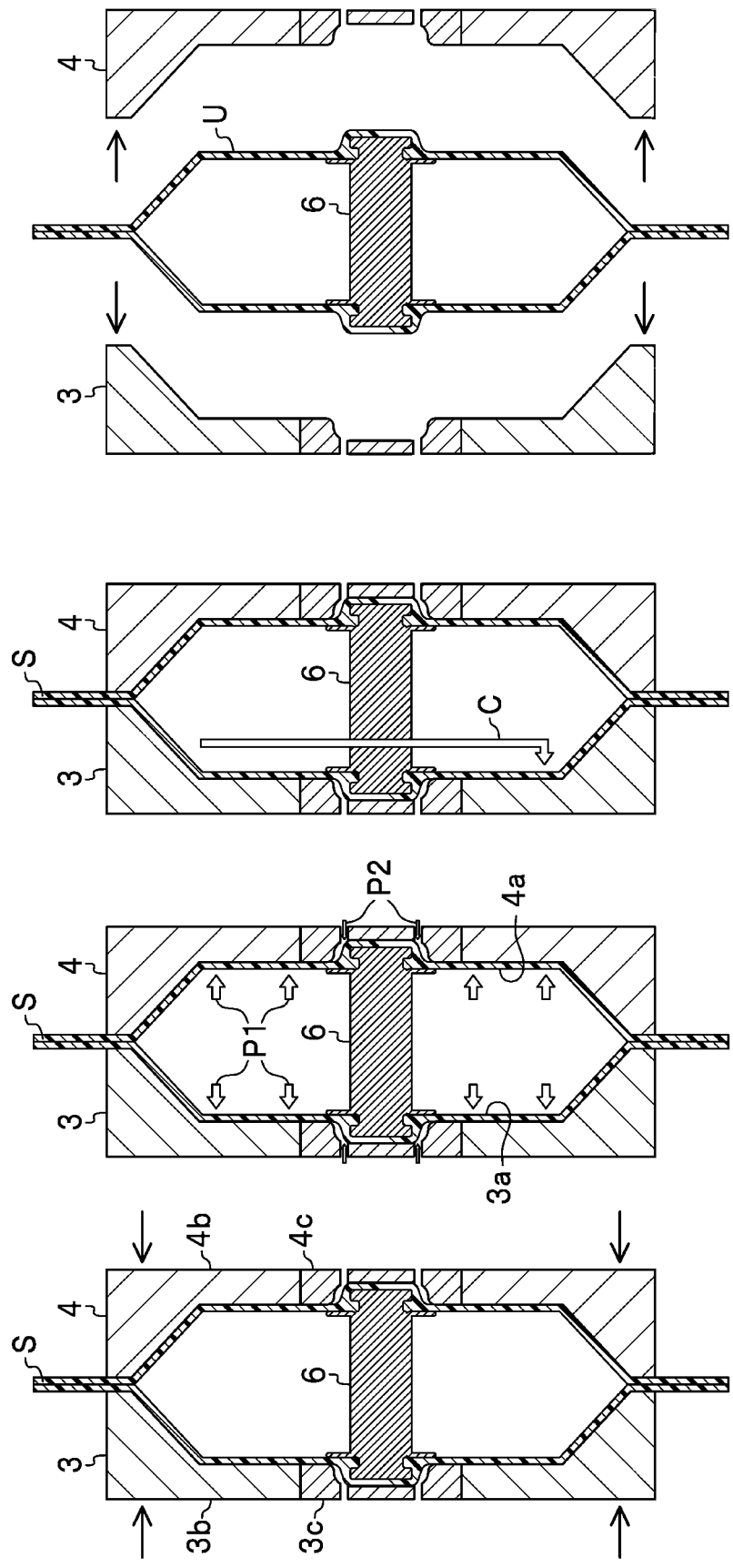

FUEL TANK

CROSS-REFERENCE TO RELATED APPLICATIONS

This application is a U.S. National Stage Application under 35 U.S.C § 371 of International Patent Application No. PCT/JP2020/041608 filed Nov. 6, 2020, which claims the benefit of priority under 35 USC 119 to Japanese Patent Application No. 2019-203076 filed Nov. 8, 2019, the disclosures of all of which are hereby incorporated by reference in their entireties.

TECHNICAL FIELD

The present invention relates to a fuel tank.

BACKGROUND ART

There has been known a method of attaching a component, such as a valve, as a built-in component to a blow molded product, such as a fuel tank of an automobile. For example, Patent Literature 1 describes a method of manufacturing a fuel tank, in which a built-in component having a head portion, a neck portion, and a shoulder portion is built. According to this method of manufacturing a fuel tank, air is fed into a parison from outside the parison during the molding of a tank body to shape the parison along the neck portion and to fix the built-in component to the tank body. At this time, the air around the neck portion is discharged toward the body portion to vent the air using holes formed in the neck portion having a cylindrical shape and the shoulder portion surrounded by the neck portion.

CITATION LIST

Patent Literature

Patent Literature 1: International Patent Application Publication No. 2018/225413

SUMMARY OF INVENTION

Technical Problem

From the manufacturing point of view, it is desirable that the structure of the built-in component be simple, but the formation of air vent holes makes the structure of the built-in component complex and the manufacturing process complicated. Further, if air vent holes are formed, the holes are filled with parison before air venting is completed, and air venting paths are blocked. If the air around the neck portion is not sufficiently discharged, it becomes difficult to form the parison around the neck portion without fail. This may lead to a decrease in the fixing strength.

The present invention has been devised from such a viewpoint, and an object of the present invention is to provide a fuel tank which is simple in structure and can reliably form a parison around a neck portion.

Solution to Problem

In order to solve the above problem, the present invention provides a fuel tank made of plastic resin and comprising a built-in component having a head portion, a neck portion, and a shoulder portion, the built-in component being anchored to a tank body by blowing air from outside a parison to cause the parison wrap around the neck portion during molding of the tank body, wherein a slit extending in one direction only is formed on a surface of the shoulder portion as an air vent path, the slit has a cross-sectional shape such that a width thereof becomes narrower in a depth direction, and the plastic resin enters the slit and a cavity is formed on a distal side of the slit in the depth direction.

According to the present invention, there is no need to provide a complicated air vent path, and the structure of the built-in component can be simplified. This makes it easy to manufacture a molding die for molding the built-in component and can reduce the manufacturing cost. Further, the air around the neck portion can be discharged through the slit during the molding, so that it is possible to reliably form a parison around the neck portion.

Further, since a parison is less likely to enter the slit, it is possible to prevent the slit from being blocked by the parison before the discharge of air around the neck portion is completed. Accordingly, it is possible to more reliably form a parison around the neck portion.

It is preferable that the slit have a triangular cross-sectional shape and that an angle between a first wall portion and a second wall portion that constitute the slit be an acute angle. With this configuration, a parison is much less likely to enter the slit.

It is preferable that the slit be provided on each side of the neck portion. This allows the air around the neck portion to be discharged efficiently in a well-balanced manner.

Advantageous Effects of Invention

According to the present invention, the fuel tank is simple in structure and can reliably form a parison around a neck portion.

BRIEF DESCRIPTION OF DRAWINGS

FIG. 10A is a diagram to illustrate a step of injecting a parison in a method of manufacturing a fuel tank with the fuel tank manufacturing apparatus.
FIG. 10B is a diagram to illustrate a step of introducing the built-in component in the method of manufacturing a fuel tank with the fuel tank manufacturing apparatus.
FIG. 10C is a diagram to illustrate a step of temporary setting the built-in component in the method of manufacturing a fuel tank with the fuel tank manufacturing apparatus.
FIG. 11A is a diagram to illustrate a step of closing a molding die in the method of manufacturing a fuel tank with the fuel tank manufacturing apparatus.

FIG. 11B is a diagram to illustrate a step of blow molding in the method of manufacturing a fuel tank with the fuel tank manufacturing apparatus.

FIG. 11C is a diagram to illustrate a step of cooling the parison in the method of manufacturing a fuel tank with the fuel tank manufacturing apparatus.

FIG. 11D is a diagram to illustrate a step of opening the molding die in the method of manufacturing a fuel tank with the fuel tank manufacturing apparatus.

DESCRIPTION OF EMBODIMENTS

<<Fuel Tank According to One Embodiment>>

Figure 1:
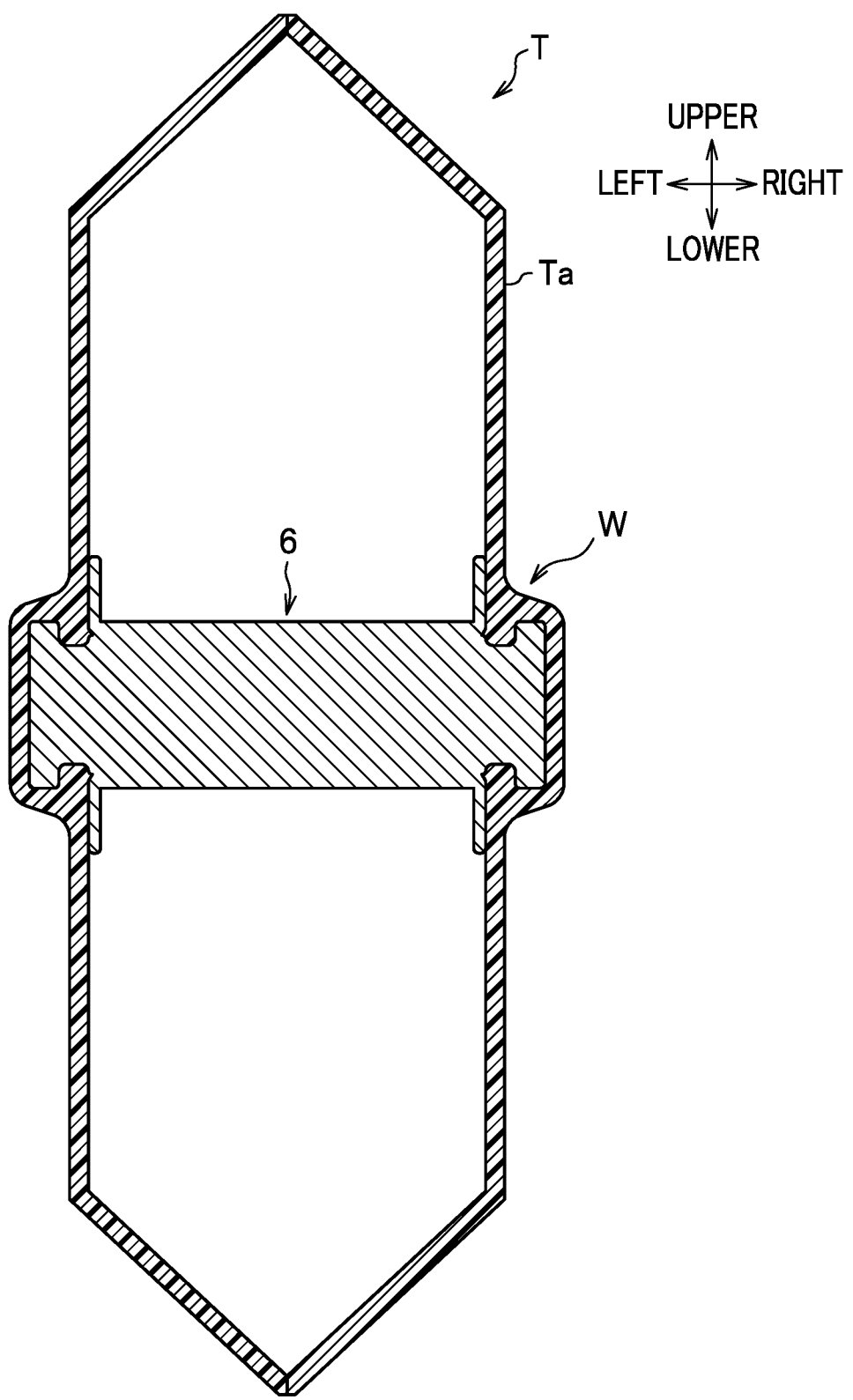
FIG. 1 is a schematic cross-sectional view of a fuel tank according to an embodiment of the present invention.

A fuel tank T shown in FIG. 1 is a fuel tank to be mounted on a transportation means such as an automobile, a motorcycle, and a ship, and mainly includes a tank body Ta and a built-in component 6. As shown in FIG. 1, the present embodiment exemplarily provides a columnar reinforcing member for maintaining the strength of the fuel tank T, as the built-in component 6, but the built-in component 6 may be a valve, a wave-eliminating plate, or the like. In the following description, "upper-lower" and "right-left" directions refer to corresponding directions shown by arrows in FIG. 1. These directions are defined for the purpose of illustration and do not limit the present invention. It should be noted that the right-left direction in FIG. 1 corresponds to the opening and closing direction of a pair of molding dies for manufacturing the fuel tank T.

The tank body Ta is a hollow container made of plastic resin for storing fuel such as gasoline, and has a multi-layer structure including a barrier layer, for example. The tank body Ta is made of mainly a thermoplastic resin such as polyethylene and high-density polyethylene. The tank body Ta is formed, for example, by blow molding.

The configuration of the built-in component 6 is described below, with reference to FIGS. 2 to 6. A parison S (see FIG. 7) as a precursor to the tank body Ta has a multi-layered structure in cross section made of HDPE (high-density polyethylene), EVOH (ethylene-vinyl alcohol copolymer), an adhesive layer and the like.

Figure 2:
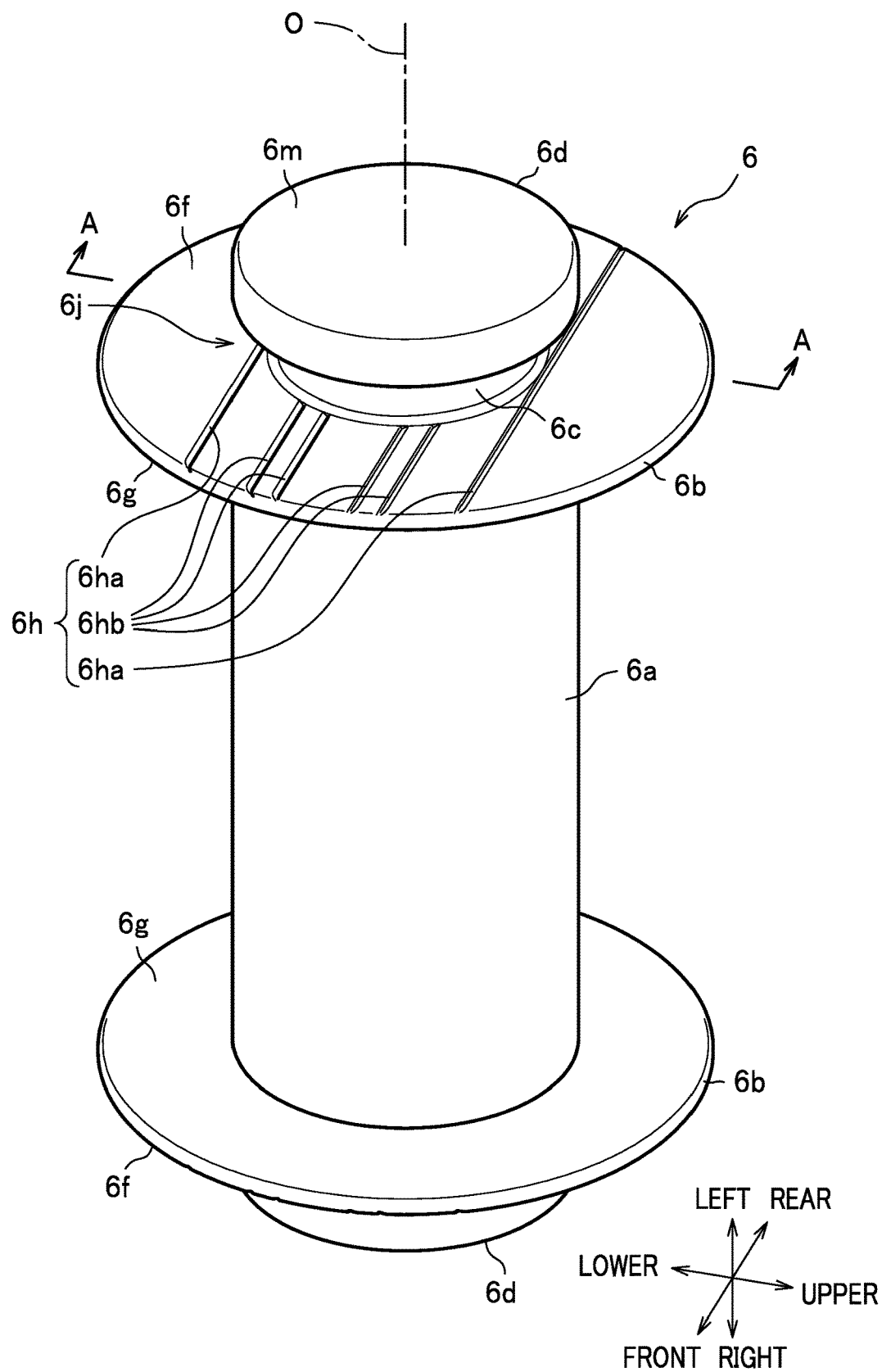
FIG. 2 is an external perspective view of a built-in component.

As shown in FIG. 2, the built-in component 6 includes a columnar body portion 6a, shoulder portions 6b, 6b formed at right and left ends of the body portion 6a, neck portions 6c, 6c formed on right and left outer sides of the shoulder portions 6b, 6b, and head portions 6d, 6d. The built-in component 6 has a structure such that the right side and the left side thereof (upper side and lower side on the plane of paper) are mirror-symmetrical with each other. Thus, only one side is described here, unless otherwise specified. Further, in the description of the built-in component 6, a surface facing the body portion 6a is referred to as a "back surface", and a surface opposite to the "back surface" is referred to as a "front surface".

The body portion 6a shown in FIG. 2 is a portion as a main body of the built-in component 6. A plurality of lightening holes may be formed in the body portion 6a. The lightening holes (not shown) are formed to reduce the weight and increase the capacity of the fuel tank T (see FIG. 1).

Figure 3:
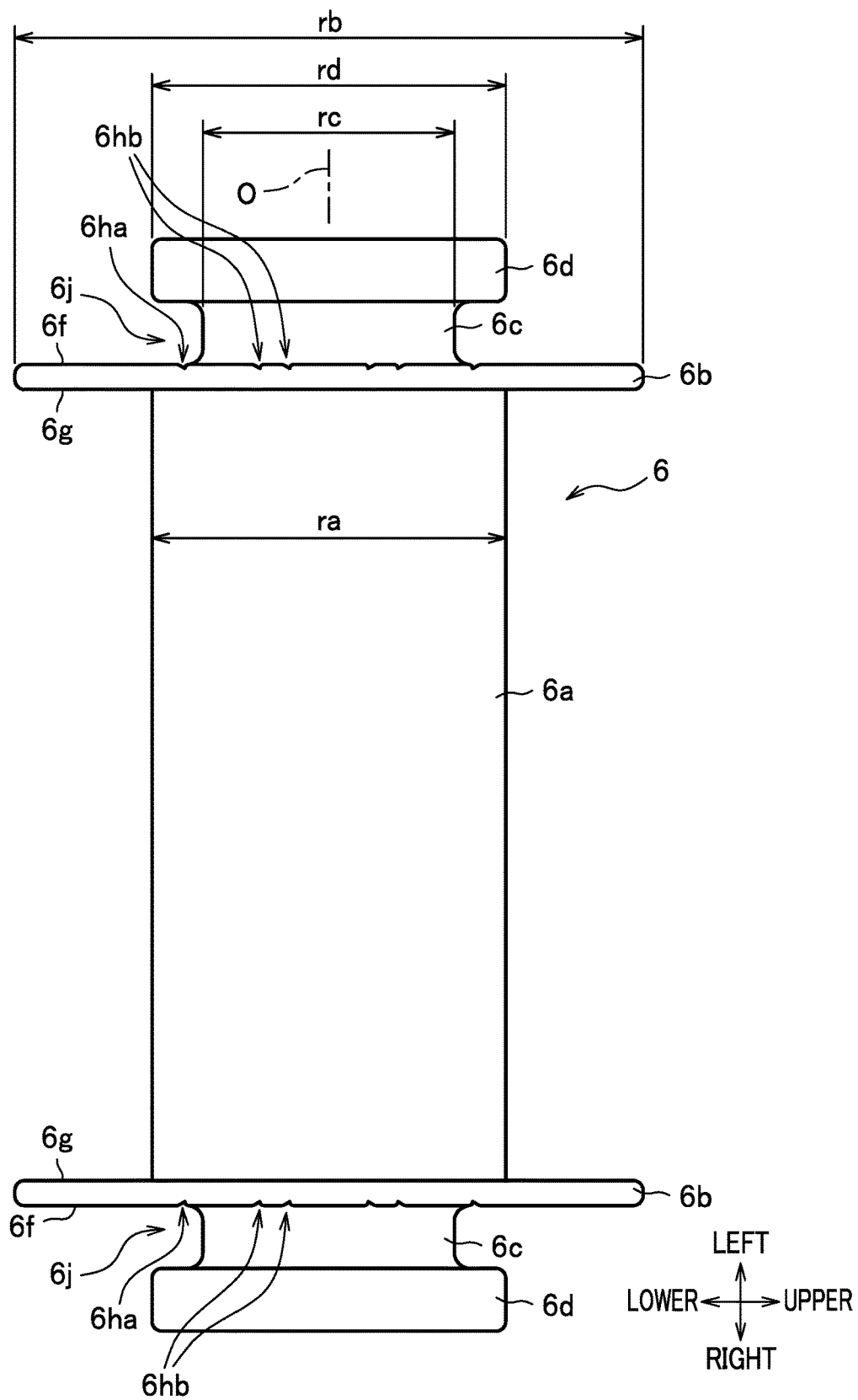
FIG. 3 is a front view of the built-in component.
Figure 7:
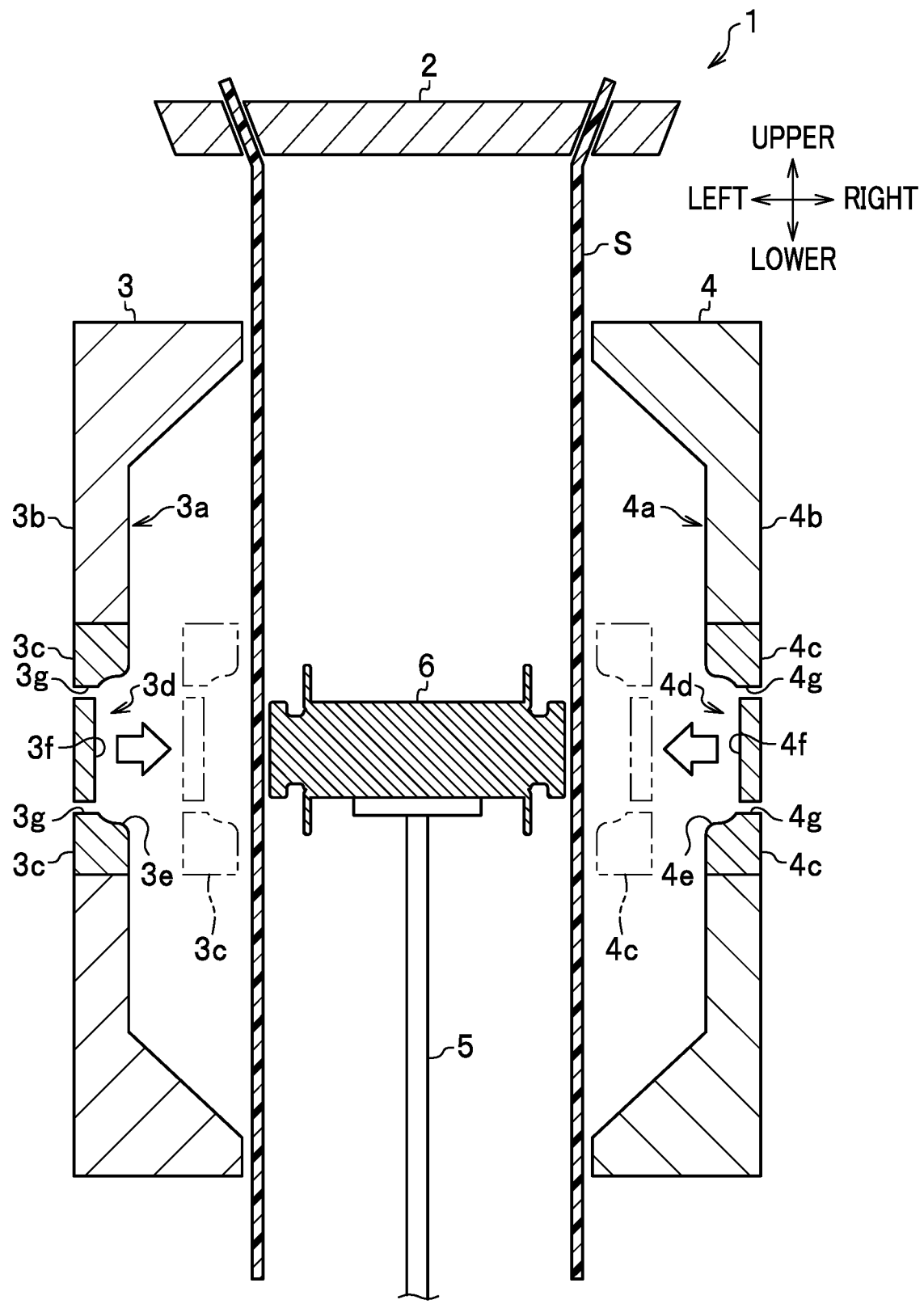
FIG. 7 is a schematic vertical cross-sectional view of a fuel tank manufacturing apparatus.

The shoulder portion 6b shown in FIG. 2 is a portion to cover a recess 3d of a first molding die 3 or a recess 4d of a second molding die 4 shown in FIG. 7. The shape and size of the shoulder portion 6b are not particularly limited as long as the shoulder portions 6b can cover the recesses 3d and 4d. The shoulder portion 6b here has a circular disk shape made of a thin plate. As shown in FIG. 3, the outer diameter "rb" of the shoulder portion 6b is larger than the outer diameter "ra" of the body portion 6a.

The neck portion 6c shown in FIG. 2 is a portion connecting the shoulder portion 6b and the head portion 6d. As shown in FIG. 3, the diameter of the neck portion 6c is smaller than that of the shoulder portion 6b and that of the head portion 6d. The neck portion 6c here rises from a front surface 6f of the shoulder portion 6b and is formed to have a columnar shape. A corner portion formed by the shoulder portion 6b and the neck portion 6c and a corner portion formed by the head portion 6d and the neck portion 6c are rounded.

The head portion 6d shown in FIG. 2 has a circular disk shape made of a thick plate having a thickness larger than that of the shoulder portion 6b. It should be noted that the relationship between the thickness of the shoulder portion 6b and the thickness of the head portion 6d here is shown by way of an example. The shoulder portion 6b may be thicker than the head portion 6d. As shown in FIG. 3, the outer diameter "rd" of the head portion 6d is larger than the outer diameter "rc" of the neck portion 6c, and smaller than the outer diameter "rb" of the shoulder portion 6b. Because of this shape, a gap 6j is formed between the shoulder portion 6b and the head portion 6d while the neck portion 6c serves as the bottom of the gap 6j. The gap 6j is a portion where the parison S enters during molding.

The shape and size of the head portion 6d are not particularly limited as long as the parison S can enter around the head portion 6d and neck portion 6c to anchor the built-in component 6 to the tank body Ta (see FIG. 1). That portion of the parison S which wraps around the neck portion 6c is referred to as a "parison equivalent portion W" (see FIG. 9). It should be noted that a surface 6m of the head portion 6d may be formed with a plurality of ribs (not shown) rising, for example, as ring-shaped ribs. The ribs on the head portion 6d are formed, foe example, along circles whose center coincides with the axis O.

Figure 4:
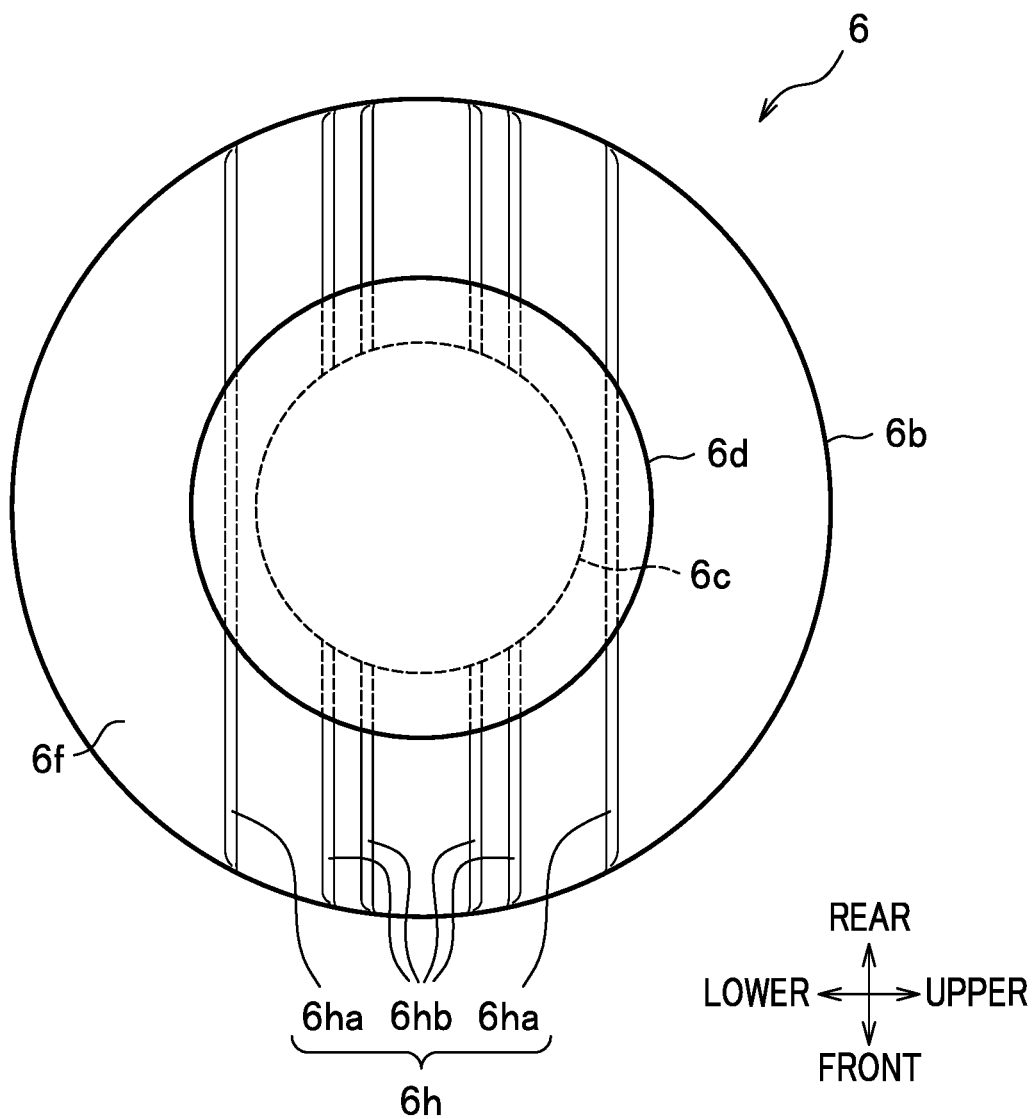
FIG. 4 is a plan view of the built-in component.

As shown in FIG. 2, at least one slit 6h (a plurality of slits 6h in this embodiment) is formed on the surface 6f of the shoulder portion 6b (the surface facing the neck portion 6c). The slit 6h serves as an air vent path to discharge the air in the gap 6j when the parison S enters the gap 6j during molding. The shape, size, number, location, etc. of the slit(s) 6h are not particularly limited as long as the slit(s) 6h can discharge the air from the gap 6j during molding. In a case where the built-in component 6 is injection molded, in order to facilitate removal from the molds, it is preferable that the slits 6h extend in one direction to have a straight line shape. In other words, the direction in which the slits 6h extend corresponds to the opening and closing directions of the pair of molds for manufacturing the built-in components 6. The slits 6h here are formed in the front-rear direction. As shown in FIG. 4, the plurality of slits 6h formed on the surface 6f of the shoulder portion 6b are parallel to each other.

In this embodiment, as shown in FIG. 4, the slits 6h include first slits 6ha formed to pass through sides of the neck portion 6c, and second slits 6hb separately formed on both sides of the neck portion 6c with the neck portion 6c sandwiched between the slits 6hb. It should be noted that only one of the first slits 6ha and the second slits 6hb may be formed.

Figure 5:
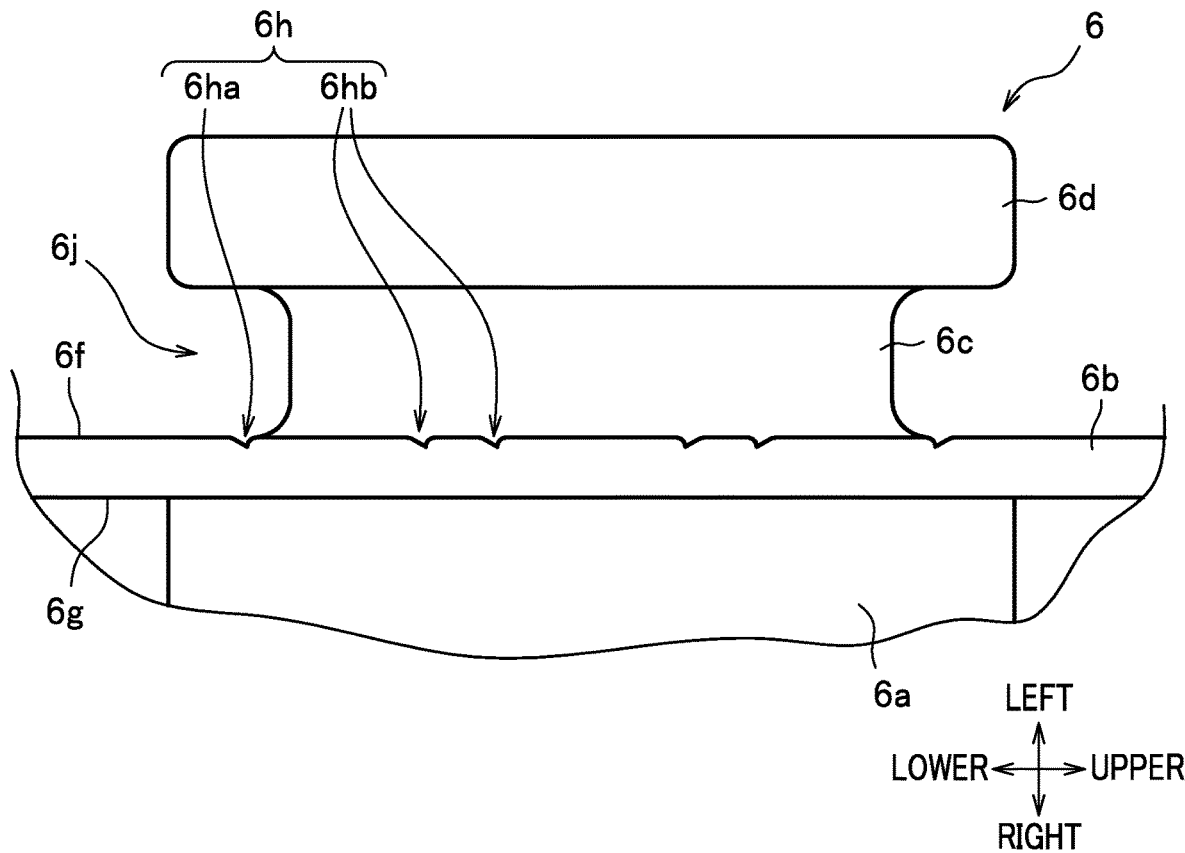
FIG. 5 is an enlarged front view of the built-in component.

As shown in FIG. 4, both ends of the first slits 6*ha* reach the peripheral edge portion of the shoulder portion 6*b*. The first slits 6*ha* are arranged such that at least part of the first slits 6*ha* pass under the head portion 6*d*. As shown in FIG. 5, it is preferable that the first slits 6*ha* be formed at positions closer to the neck portion 6*c* (i.e., at the root of the neck portion 6*c*).

As shown in FIG. 4, each of the second slits 6*hb* has one end reaching the peripheral edge portion of the shoulder portion 6*b* and the other end reaching the periphery of the neck portion 6*c*.

Preferably, the slit 6*h* is shaped such that the parison S is less likely to enter the slit 6*h* during molding. In other words, the width of the slit 6*h* becomes narrower at the distal side of the slit 6*h* in the depth direction to such an extent that the parison S does not block the slit 6*h* before air venting is completed in the molding stage. A minute cavity may remain on the distal side of the slit 6*h* in the depth direction even after the molding.

Figure 6:
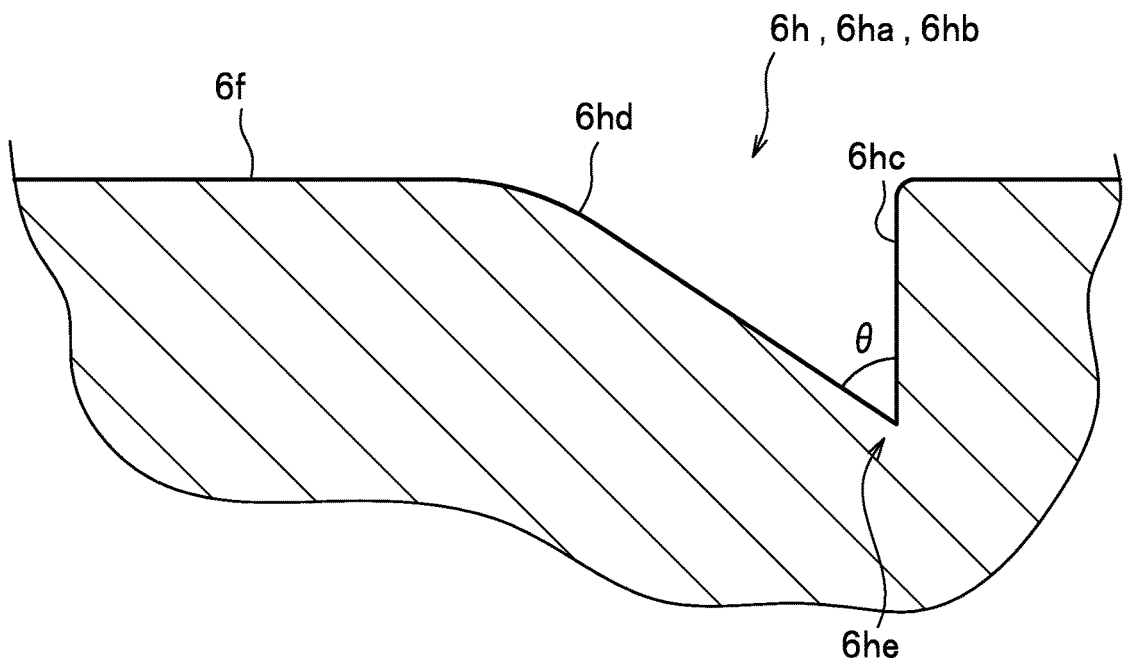
FIG. 6 is a cross-sectional view of a slit.

As shown in FIG. 6, the slit 6*h* here consists of a first wall portion 6*hc* and a second wall portion 6*hd*. The slit 6*h* has a triangular cross-sectional shape orthogonal to the direction where the slit 6*h* extends. The width of the slit 6*h* gradually narrows in the depth direction of the slit 6*h*, so that the parison S is less likely to enter the region especially around the distal end 6*he* of the slit 6*h*. It is preferable that the angle θ between the first wall portion 6*hc* and the second wall portion 6*hd* be an acute angle. Although the slit 6*h* here is open in its upper side, a part of the slit 6*h* may be covered.

<<Method of Manufacturing Fuel Tank of this Embodiment>>

A fuel tank manufacturing apparatus 1 shown in FIG. 7 is an apparatus for blow-molding a parison S in a cylindrical shape to manufacture a fuel tank T (see FIG. 1) with a built-in component 6. The fuel tank T may be manufactured by molding a sheet-like parison (not shown).

As shown in FIG. 7, the fuel tank manufacturing apparatus 1 mainly includes a die 2, a pair of first and second molding dies 3, 4, and an elevator 5 configured to move up and down between the first molding die 3 and the second molding die 4.

The die 2 is arranged above the first molding die 3 and the second molding die 4. The die 2 is a supply means to supply a parison S to the first molding die 3 and the second molding die 4. The parison S has a multi-layered structure in cross section made of HDPE (high density polyethylene), EVOH (ethylene-vinyl alcohol copolymer), an adhesive layer, and the like. The parison S is a preform to be formed into a tank body Ta constituting a fuel tank T (see FIG. 1).

The first molding die 3 and the second molding die 4 shown in FIG. 7 are molding means for clamp-molding a fuel tank T (see FIG. 1). The first molding die 3 and the second molding die 4 are arranged to face each other, and molding portions 3*a*, 4*a* in the shape of a recess are formed in the opposite surfaces thereof. The first molding die 3 and the second molding die 4 can be moved in the right-left directions so as to be opened and closed. The parison S is supplied while the first molding die 3 and the second molding die 4 are opened (in the state shown in FIG. 7). The first molding die 3 and the second molding die 4 are provided with blow pins (not shown) for blowing air into the first molding die 3 and the second molding die 4, so that the air pressure (blow pressure) in the first molding die 3 and the second molding die 4 can be suitably adjusted by a first positive pressure applying means (not shown). The parison S is transferred to the molding portions 3*a*, 4*a* by the first positive pressure applying means.

The first molding die 3 is configured to be separable, and includes a main body portion 3*b* and a separating portion 3*c* that can be separated from the main body portion 3*b*. Similarly, the second molding die 4 is configured to be separable, and includes a main body portion 4*b* and a separating portion 4*c* that can be separated from the main body portion 4*b*. The separating portions 3*c* and 4*c* are respectively formed with the recesses 3*d*, 4*d* corresponding to the shapes of both end portions of the built-in component 6. The recesses 3*d*, 4*d* are formed to accommodate a part of the built-in component 6. The recesses 3*d*, 4*d* here are formed into a columnar shape. Further, a plurality of air holes 3*g*, 4*g* are formed in bottoms 3*f*, 4*f* of the recesses 3*d*, 4*d*, respectively, for blowing air into the recesses 3*d*, 4*d*. The air pressure (blow pressure) in the recesses 3*d*, 4*d* is suitably adjusted by a second positive pressure applying means (not shown).

The elevator 5 is a moving means for moving the built-in component 6 to the mounting position. The mounting position here is the position inside the parison S in a cylindrical shape and between the separating portions 3*c*, 4*c*.

Next, a description is given of operation of the fuel tank manufacturing apparatus 1. Before describing the whole process of the method of manufacturing the fuel tank T (see FIG. 1) with the fuel tank manufacturing apparatus 1, a description is given of transferring the parison around end portions of the built-in component 6.

<Transferring Parison Around End Portions of Built-In Component>

Figure 8:
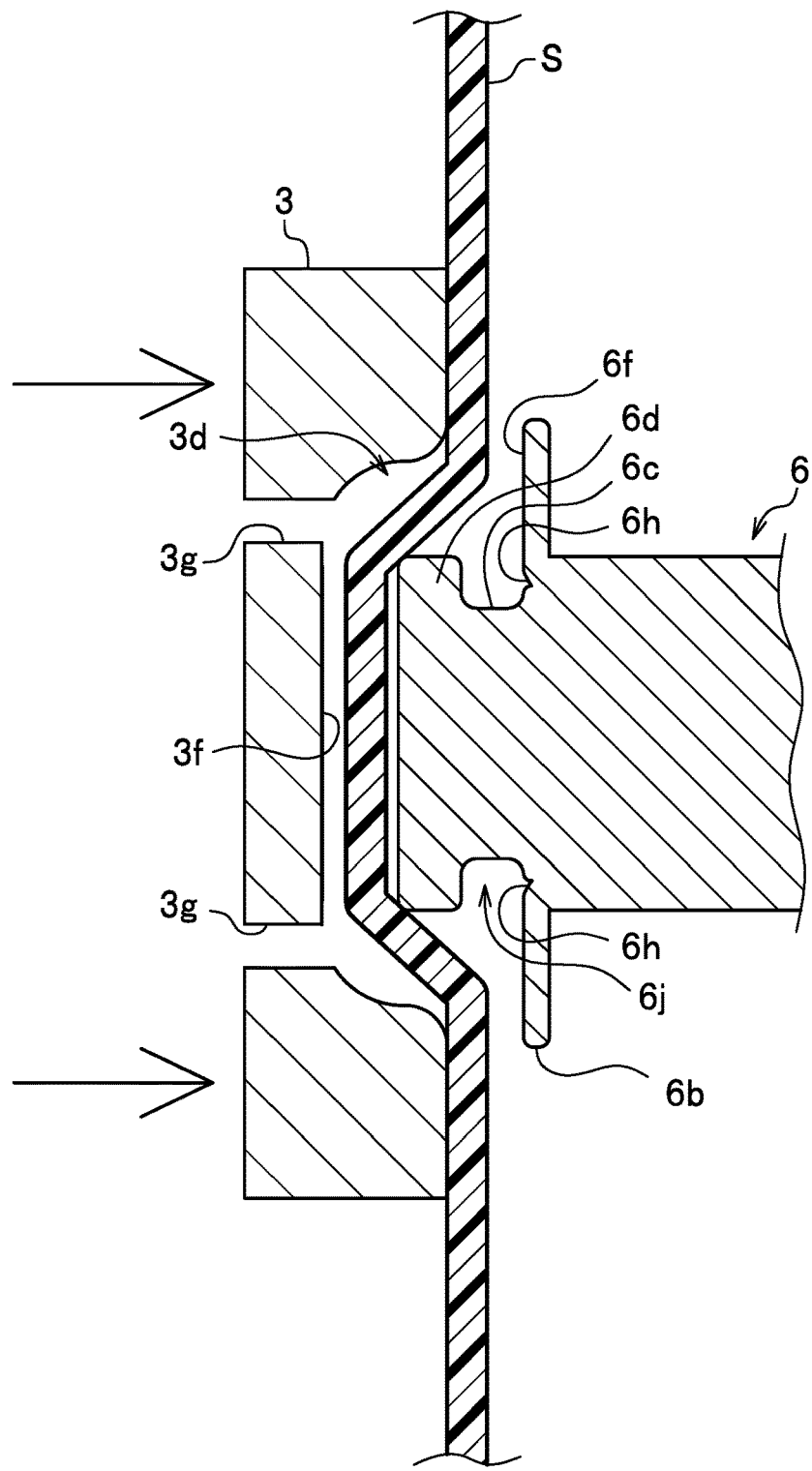
FIG. 8 is a diagram to illustrate transferring a parison around an end portion of the built-in component during molding.
Figure 9:
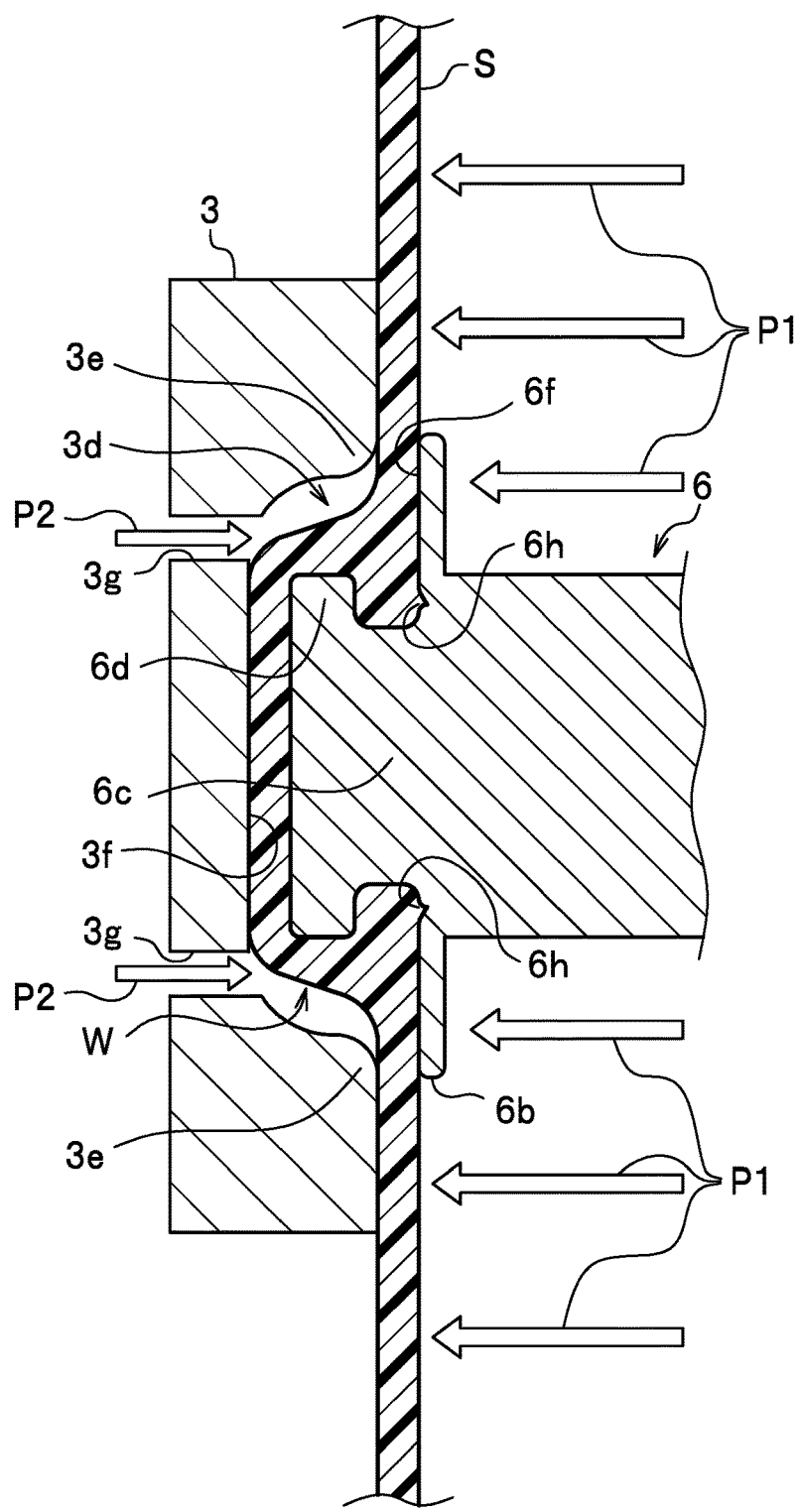
FIG. 9 is a diagram to illustrate transferring a parison around an end portion of the built-in component during molding.

With reference to FIGS. 8 and 9 (see FIGS. 1 to 7 as required), a description is given of transferring the parison S around end portions of the built-in component 6 during molding. It should be noted that a description is given here of the first molding die 3, but the same applies to the second molding die 4. The built-in component 6 shown in FIGS. 8 and 9 is cut at the A-A position in FIG. 2.

As shown in FIG. 8, in the fuel tank manufacturing process, the first molding die 3 is moved in the direction of the arrow and then clamed so that the neck portion 6*c* and the head portion 6*d* of the built-in component 6 are pushed into the recess 3*d* along with the parison S.

As shown in FIG. 9, when the shoulder portion 6*b* contacts the parison S and covers the opening of the recess 3*d*, and the neck portion 6*c* and the head portion 6*d* are completely pushed (accommodated) into the recess 3*d*, air is blown into the first molding die 3 to generate a positive pressure P1 (first positive pressure) in the parison S so that the parison S is transferred to the first molding die 3. Further, air is blown into the recess 3*d* from the air hole 3*g* formed in the recess 3*d* to generate a positive pressure P2 (second positive pressure) in the recess 3*d*, so that the parison S is made to enter into the gap 6*j* between the shoulder portion 6*b* and the head portion 6*d* and then transferred. The air in the gap 6*j* is discharged through the slits 6*h* formed on the front surface 6*f* of the shoulder portion 6*b* in the direction away from the neck portion 6*c*.

At this time, the parison S is pressed between the shoulder portion 6*b* and the first molding die 3, so that the parison S and the shoulder portion 6*b* are welded to each other. Further, the parison S is pressed to the head portion 6*d* by the positive pressure P2, so that the parison S and the head portion 6*d* are welded to each other. It should be noted that the built-in component 6 may be pushed toward the recess 3*d* to hold the parison S between the head portion 6*d* and the bottom portion 3*f*, so that the parison S and the head portion 6*d* are welded to each other.

Next, a description is given of the whole process of the fuel tank manufacturing apparatus 1.

<Step of Injecting Parison>

As shown in FIG. 10A, the die 2 injects the parison S in a cylindrical shape into a space between the first molding die 3 and the second molding die 4 which are both opened.

<Step of Introducing Built-In Component>

Next, as shown in FIG. 10B, the elevator 5 is moved up, with the built-in component 6 held by the elevator 5, to move the built-in component 6 to the mounting position. Here, the mounting position is located inside the parison S and between the separating portions 3*c*, 4*c*.

<Step of Temporary Setting Built-In Component>

Next, as shown in FIG. 10C, the separating portions 3*c*, 4*c* of the first molding die 3 and the second molding die 4 are moved in the direction opposite to each other to hold the built-in component 6 from both ends. Then, the elevator 5 is moved down, with the built-in component 6 released, and retracts to the initial position. The initial position of the elevator 5 can be any position as long as it does not interfere with the main body portions 3*b*, 4*b* of the first molding die 3 and the second molding die 4 when they are closed.

<Step of Closing Molding Dies>

Next, as shown in FIG. 11A, the main body portions 3*b*, 4*b* of the first molding die 3 and the second molding die 4 are moved in the direction opposite to each other, and the first molding die 3 and the second molding die 4 are clamped.

<Step of Blow Molding>

Next, as shown in FIG. 11B, the first positive pressure applying means (not shown) applies the positive pressure P1 (first positive pressure) from inside the parison S disposed in the first molding die 3 and the second molding die 4. This causes the parison S to be pressed to the molding portions 3*a*, 4*a* of the first molding die 3 and the second molding die 4 and then transferred. Further, the second positive pressure applying means (not shown) applies the positive pressure P2 (second positive pressure) from outside the parison S disposed in the recesses 3*d*, 4*d* of the first molding die 3 and the second molding die 4 (see FIG. 7). This causes the parison S to be shaped along the neck portion 6*c* of the built-in component 6 (see FIG. 9). It should be noted that the method and order of applying the positive pressure P1 and the positive pressure P2 are not particularly limited. The positive pressure P2 is preferably set higher than the positive pressure P1.

<Step of Cooling Parison>

Next, as shown in FIG. 11C, a cooling means (not shown) is used to circulate cooling air C in the first molding die 3 and the second molding die 4. This causes the parison S to be cooled and cured.

<Step of Opening Molding Dies>

Next, as shown in FIG. 11D, the first molding die 3 and the second molding die 4 are opened and a molded product U is taken out. Then, unnecessary burrs formed at both ends are cut to finish the fuel tank T (see FIG. 1).

According to the above-described embodiment, since the air in the gap 6*j* can be discharged through the slits 6*h* during the molding, it is possible to reliably form a parison around the neck portion 6*c*. Therefore, it is possible to suppress a decrease in the fixing strength.

Further, since the slits 6*h* extending in one direction only are formed on the front surface 6*f* of the shoulder portion 6*b* around the neck portion 6*c*, the structure of the built-in component 6 can be simplified. In other words, a plurality of slits 6*h* can be easily formed by making the direction in which the slits 6*h* extend parallel to the direction in which the pair of molding dies for manufacturing the built-in component 6 are removed.

Further, since the slits 6*h* have a cross-sectional shape such that the width thereof becomes narrower in the depth direction, it is possible to prevent the slits 6*h* from being blocked before air venting is completed in the molding stage. Accordingly, air venting can be performed in a more reliable manner.

Further, the slits 6*h* are arranged equally on both sides of the neck portion 6*c*. This allows the air around the neck portion 6*c* to be discharged efficiently in a well-balanced manner, so that the parison S can be formed around the neck portion 6*c* in a well-balanced manner.

Although the present invention has been described with reference to the above embodiment, it should be understood that various changes and modifications in design can be made where appropriate without departing from the gist of the present invention.

Figure 12A:
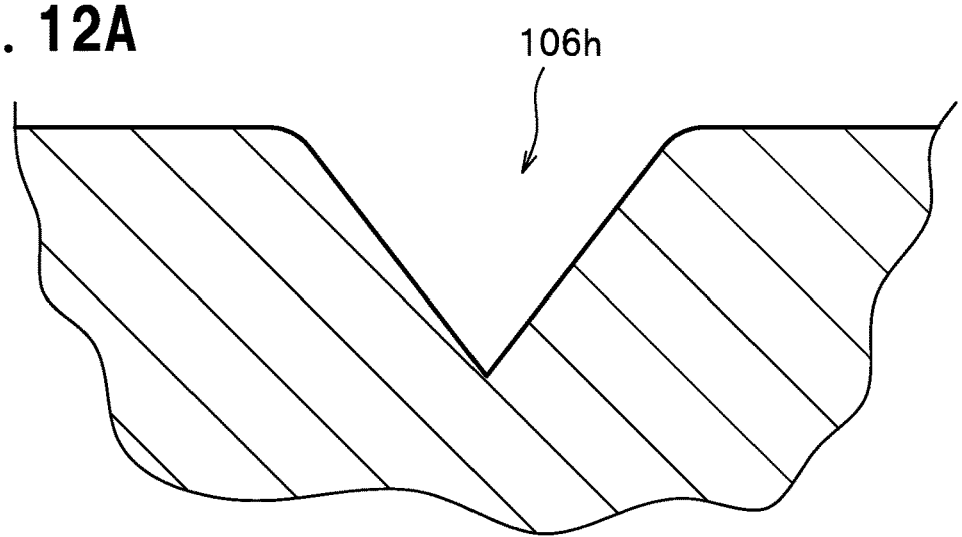
FIG. 12A is a cross-sectional view of the slit according to a first modification.
Figure 12B:
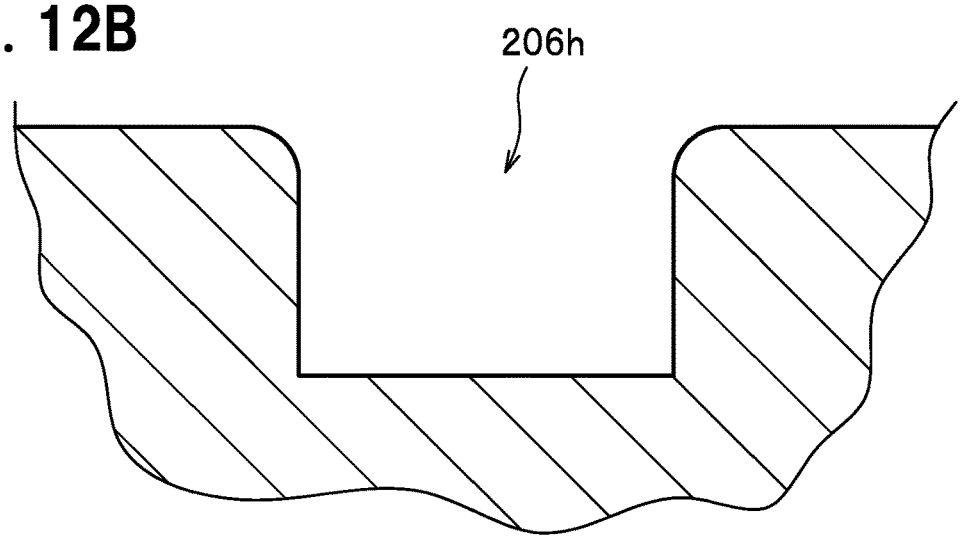
FIG. 12B is a cross-sectional view of the slit according to a second modification.
Figure 12C:
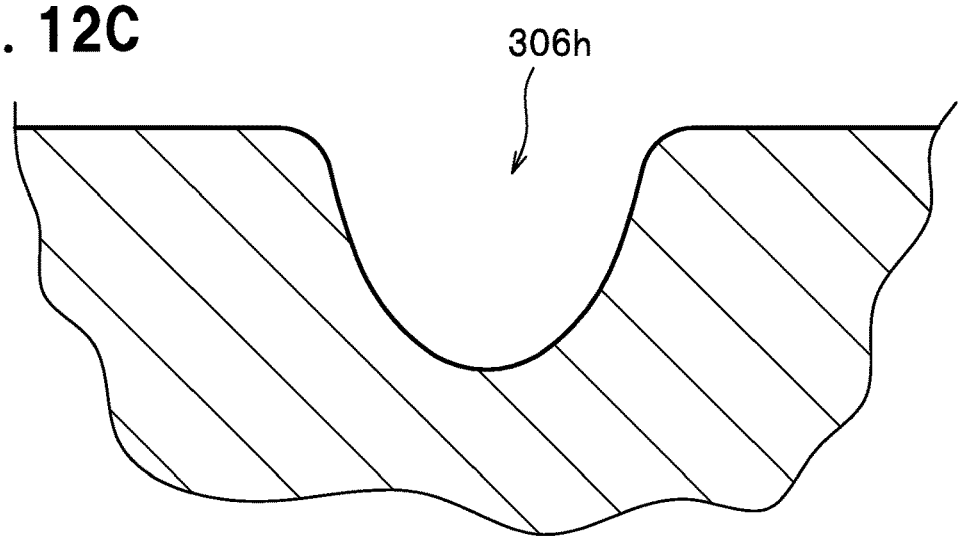
FIG. 12C is a cross-sectional view of the slit according to a third modification.

As shown in FIG. 6, each of the slits 6*h* according to this embodiment has a right-angled triangular cross-sectional shape orthogonal to the direction where the slit 6*h* extends. However, the shape of the slit 6*h* is not limited to this specific shape. For example, as shown in FIG. 12A, the slit 106*h* having an isosceles triangular cross-sectional shape may be provided. As shown in FIG. 12B, the slit 206*h* having a rectangular cross-sectional shape may be provided. Further, as shown in FIG. 12C, the slit 306*h* having a curved cross-sectional shape may be provided.

REFERENCE SIGNS LIST

6 built-in component
6*a* body portion
6*b* shoulder portion
6*c* neck portion
6*d* head portion
6*h*, 106*h*, 206*h*, 306*h* slit
6*ha* first slit
6*hb* second slit
S parison
T fuel tank
Ta tank body

The invention claimed is:

1. A fuel tank made of plastic resin and comprising a built-in component having a head portion, a neck portion, and a shoulder portion, the built-in component being anchored to a tank body by blowing air from outside a parison to cause the parison to wrap around the neck portion during molding of the tank body, wherein
   a slit extending in one direction only is formed on a surface of the shoulder portion as an air vent path, the slit has a cross-sectional shape such that a width thereof becomes narrower in a depth direction, and the plastic resin enters the slit and a cavity is formed on a distal side of the slit in the depth direction; and
   wherein the slit has a triangular cross-sectional shape, and an angle between a first wall portion and a second wall portion that constitute the slit is an acute angle.

2. The fuel tank according to claim 1, wherein the slit is provided on each side of the neck portion.

* * * * *